United States Patent [19]
Hartson

[11] Patent Number: 5,805,211
[45] Date of Patent: Sep. 8, 1998

[54] ELECTROSTATIC PROBE DEVICE FOR SIGNAL DETECTION OF CATHODE RAY TUBE DISPLAYS

[76] Inventor: Ted E. Hartson, 10012 N. 77th St., Scottsdale, Ariz. 85258

[21] Appl. No.: 529,254

[22] Filed: Sep. 15, 1995

[51] Int. Cl.⁶ .................................................... H04N 17/02
[52] U.S. Cl. .......................... 348/184; 348/786; 348/805; 348/832; 348/776
[58] Field of Search ..................................... 348/184, 776, 348/781, 786, 805, 832–553; 313/402; 324/404, 445; H04N 17/00, 17/02, 5/68, 9/16, 5/72, 5/74

[56] References Cited

U.S. PATENT DOCUMENTS

| | | | |
|---|---|---|---|
| 4,044,376 | 8/1977 | Porter | 358/84 |
| 5,294,981 | 3/1994 | Yazolino et al. | 348/4 |
| 5,404,160 | 4/1995 | Schober et al. | 348/1 |

FOREIGN PATENT DOCUMENTS

WO 89/04100   5/1989   WIPO .

Primary Examiner—Sherrie Hsia
Attorney, Agent, or Firm—Parkhurst & Wendel

[57] ABSTRACT

An electrostatic probe device detects signals displayed on a cathode ray tube in a non-invasive manner. Specifically, the probe device includes a probe that is spaced from a fluorescent screen of a cathode ray tube by a dielectric material and a detection circuit coupled to probe. The detection circuit produces an output signal that corresponds to an input video signal supplied to the cathode ray tube. In a preferred embodiment, the probe is located directly on a face plate of the cathode ray tube, wherein the face plate acts as the dielectric material. Voltage fluctuations detected by the probe are equalized by the detection circuit. The detection circuit may also include amplification and inverter circuits, so that the output of the detection circuit can be supplied to a monitor for viewing. The image displayed on the monitor directly corresponds to the image displayed on the cathode ray tube.

18 Claims, 7 Drawing Sheets

ELECTROSTATIC PROBE DEVICE FOR SIGNAL DETECTION OF CATHODE RAY TUBE DISPLAYS

FIELD OF THE INVENTION

The invention relates in general to devices for detecting signals displayed on cathode ray tubes. More specifically, the invention relates to an electrostatic probe device that can detect signals displayed on cathode ray tubes in a non-invasive manner.

BACKGROUND OF THE INVENTION

The expansion of subscription television services, such as cable television and direct broadcast satellite services, and conventional broadcast television has driven the need for a device that is capable of monitoring the signals displayed on television sets in a non-invasive manner. In the case of broadcast television services, it is desirable to develop a device that can monitor the image displayed on a television to determine which program is being viewed at any given time in order to establish advertising ratings. In the case of subscription services, in addition to establishing advertising ratings, it is further desirable to monitor the television display to insure that unauthorized channels or pay-per-view programs are not being viewed. In either case, it is preferable that the monitoring device be non-invasive, namely, that it unobtrusively and automatically detect the signals displayed on cathode ray tube of the television without requiring action on the part of the viewer.

In view of the above, it is an object of the invention to provide a probe that can detect the signals displayed on a cathode ray tube. It is a further object of the invention to provide a probe that is non-invasive.

SUMMARY OF THE INVENTION

The invention provides an electrostatic probe device that is capable of detecting signals displayed on a cathode ray tube in a non-invasive manner. Specifically, the probe device includes a probe that is spaced from an effective anode structure, for example a fluorescent screen, shadow mask or similar structure, of a cathode ray tube by a dielectric material and a detection circuit coupled to probe. The detection circuit produces an output signal that corresponds to an input video signal supplied to the cathode ray tube. In a preferred embodiment, the probe is located directly on a face plate of the cathode ray tube, wherein the face plate acts as the dielectric material. Voltage fluctuations detected by the probe are equalized by the detection circuit. The detection circuit may also include amplification and inverter circuits, so that the output of the detection circuit can be supplied to a monitor for viewing. The image displayed on the monitor directly corresponds to the image displayed on the cathode ray tube. Thus, the output from the probe can be used to detect the images displayed on the cathode ray tube as well as on screen displays or similar features that might be selected by a user.

DESCRIPTION OF THE DRAWINGS

The invention will be described with reference to certain preferred embodiments and the accompanying drawings, wherein.

DETAILED DESCRIPTION OF THE PREFERRED EMBODIMENTS

Figure 1:
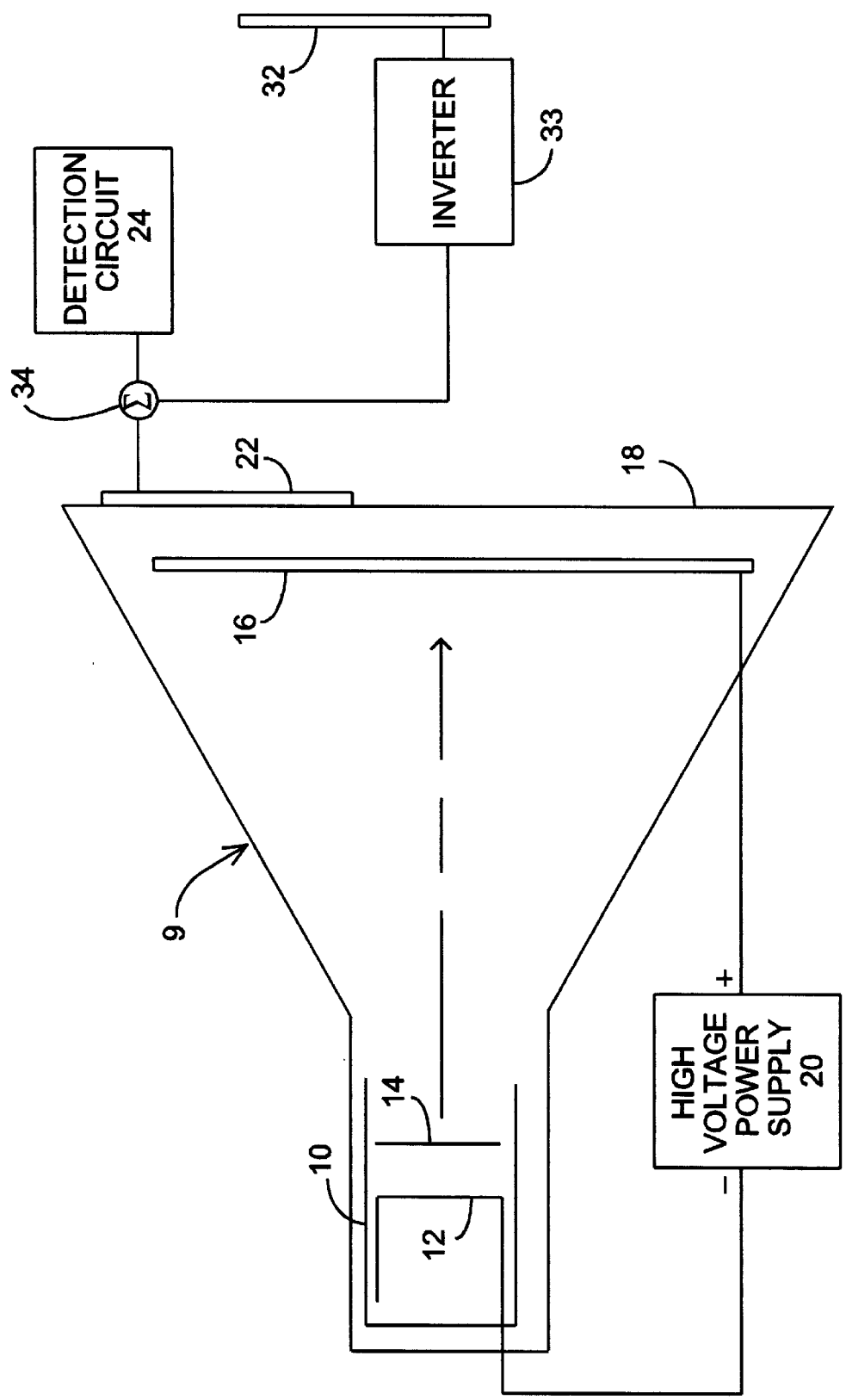
FIG. 1 is a basic schematic diagram of a cathode ray tube.

A basic schematic diagram of a cathode ray tube (CRT) is illustrated in FIG. 1. The CRT 9 includes an electron gun 10, having a cathode 12 and a control grid 14, and an effective anode structure 16, for example a fluorescent screen, shadow mask or similar structure located adjacent to a glass face plate 18. The cathode 12 and the anode structure 16 are coupled to a high voltage power supply 20. In operation, electrons are emitted from the cathode 12 and are focused as an electron beam onto the anode structure 16. The position of the electron beam is varied by either internal electrostatic deflection plates or external electromagnetic deflection coils (not shown) to produce a trace on the anode structure 16 in a conventional manner.

The high voltage power supply 20 is least loaded when the CRT is dark and no current is flowing to excite the phosphors in the anode structure 16. The high voltage produced by the high voltage power supply 20 is therefore altered to some extent as a function of the beam current. Specifically, as the high voltage power supply 20 has some practical internal resistance or source impedance, the voltage rises (CRT dark) or falls (screen phosphors excited) as the beam current fluctuates, namely, the instantaneous voltage tends to follow the reverse of the brightness of the trace displayed on the CRT. In the case of a color CRT, the same fluctuation is present for each of the colored phosphors and their corresponding electron gun structures. The variation in voltage, in a typical large screen receiver, is on the order of a few hundred volts imposed upon some 20 KV of anode potential, which is on the order of a few percent when described instantaneously. The present invention is based on the recognition that the fluctuations in the voltage are directly related to the image displayed on the CRT, and can therefore be utilized to detect the information content of the displayed image.

In order to detect the supply voltage variation, a capacitively coupled probe 22 is placed on the face plate 18 of the CRT in a preferred embodiment of the invention as illustrated in FIG. 1, thereby effectively placing the probe 22 within a fraction of an inch of the anode structure 16. The probe 22 can be located on any portion of the face plate 18 that is located in front of the anode structure, although it is preferably to locate the probe 22 along one of the side edges of the face plate 18 in order to prevent interference with the normal viewing area of the CRT. Variations in the supply voltage detected by the probe 22 are coupled to a detection circuit 24 via a virtual capacitor formed from a first plate consisting of the anode structure, a dielectric material consisting of the glass of the face plate 18, and a second plate formed by the probe 22. The detection circuit 24 provides an equalized output signal that directly corresponds to a video input signal used to modulate the beam current and produce an image on the CRT. Thus, the output of the detection circuit 24 can be used to identify the signal displayed on the CRT.

Figure 2:
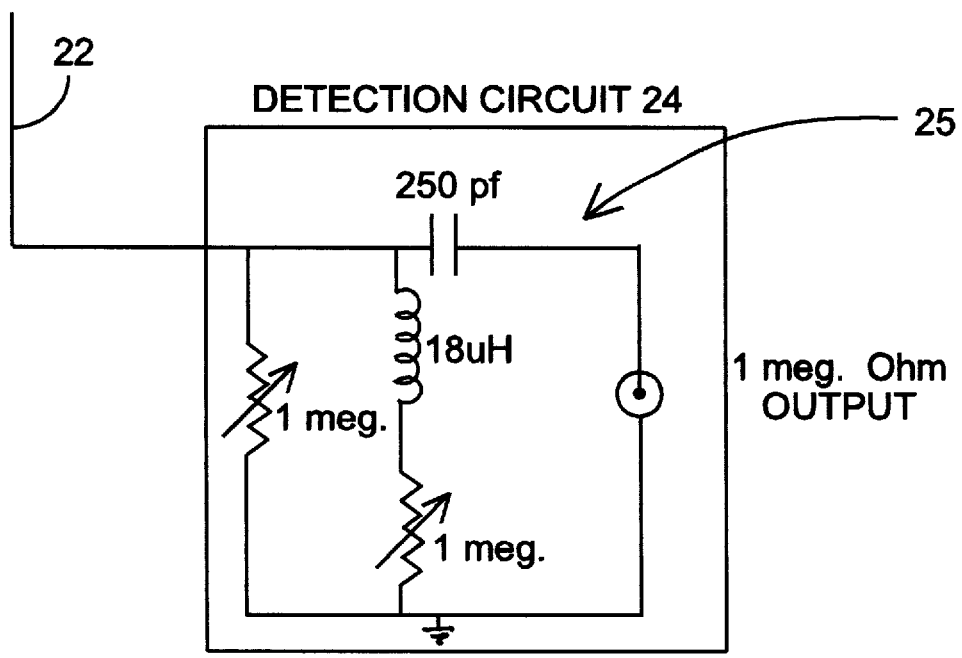
FIG. 2 is a schematic diagram illustrating a preferred detection circuit.
Figure 3:
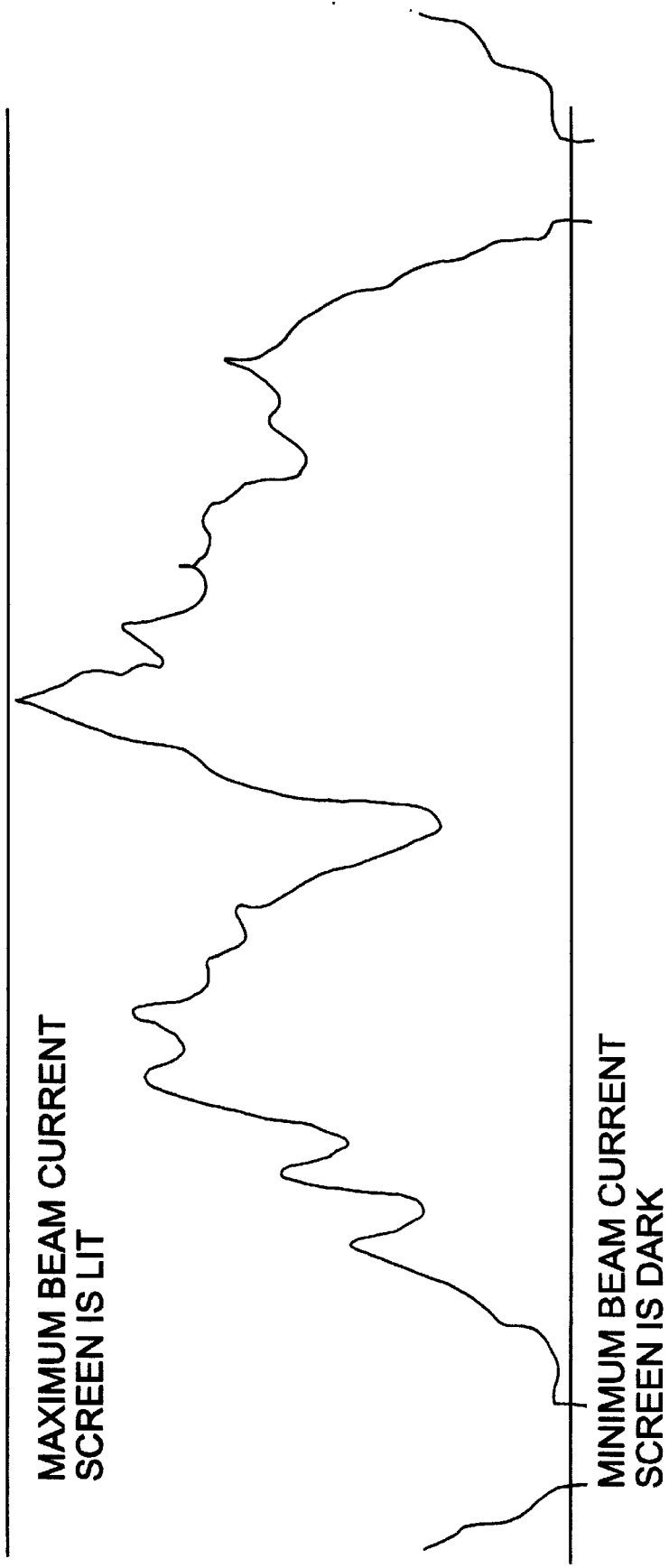
FIG. 3 illustrates an input video signal applied to the cathode ray tube illustrated in FIG. 1.
Figure 4:
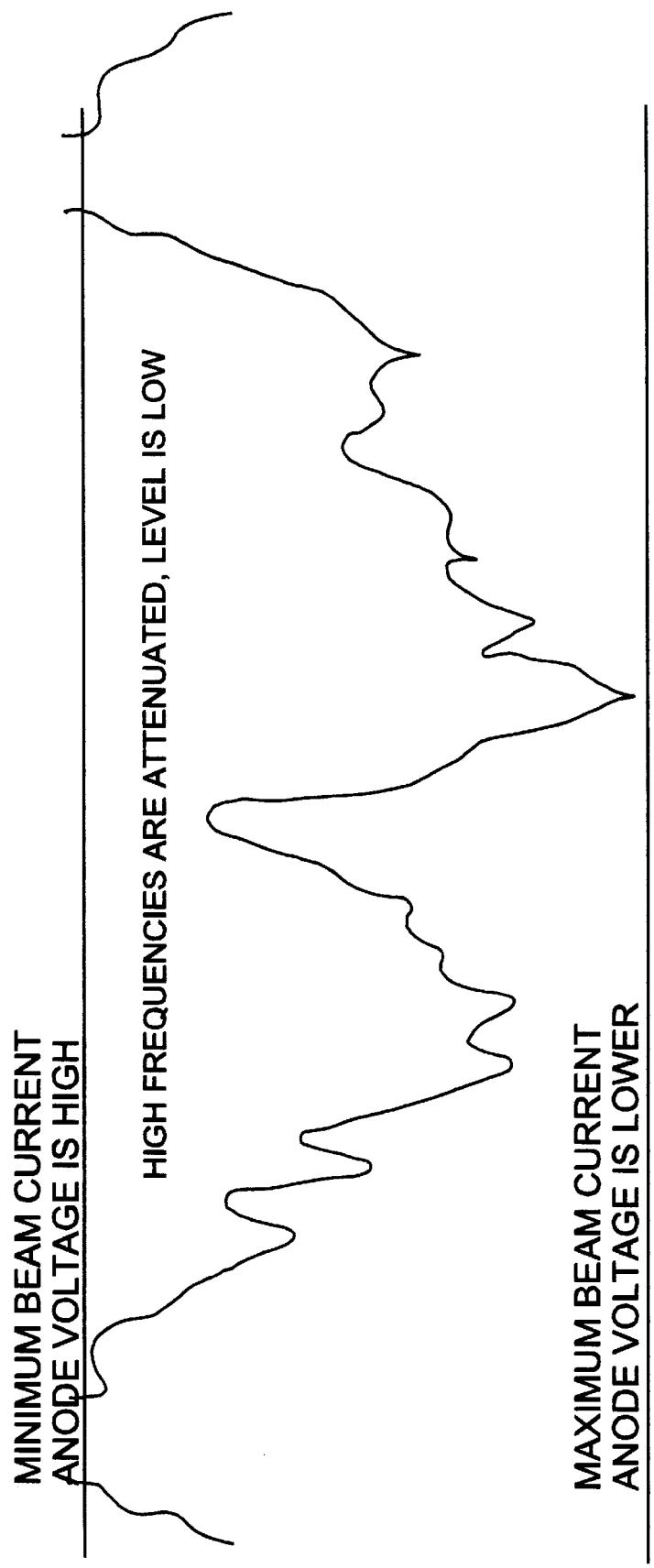
FIG. 4 illustrates the signal detected by the probe illustrated in FIG. 1.
Figure 5:
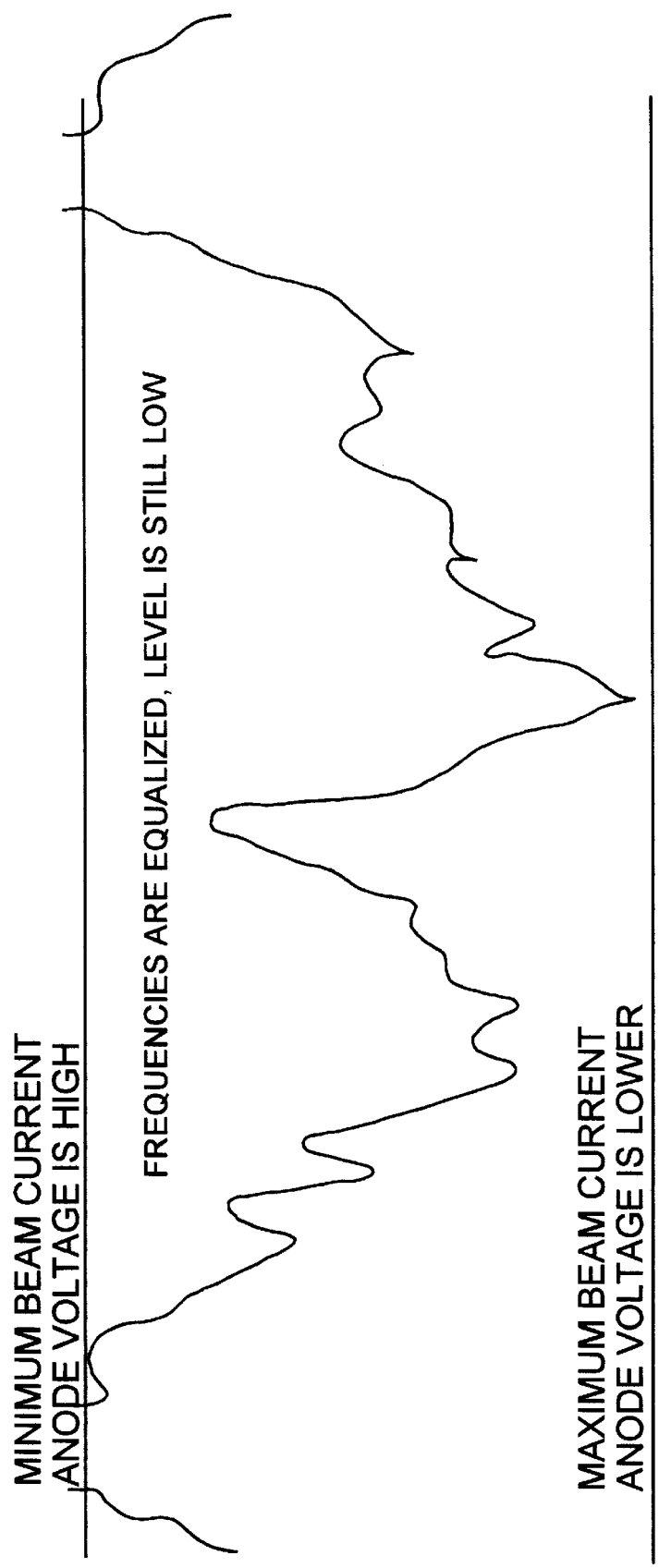
FIG. 5 illustrates the output signal from the detection circuit illustrated in FIG. 2.

FIG. 2, for example, illustrates a detection circuit 24 utilized in experiments conducted to verify the operational characteristics of the probe 22. In the illustrated example, a ten inch piece of wire taped on the face plate of the CRT was utilized as the probe 22. The probe 22 was therefore effectively within about 0.25 inches of the phosphors in the fluorescent screen of the CRT. The probe 22 was coupled to a detection circuit 24 including an equalization circuit 25 formed from a resistor-inductor-capacitor network as illustrated. An input video signal, as illustrated in FIG. 3, was then applied to the CRT. Fluctuations in the supply voltage were picked up by the probe 22 as shown in FIG. 4 and supplied to the detection circuit 24, which generated the output signal illustrated in FIG. 5. As can be seen, the output of the detector circuit 24 shown in FIG. 5 corresponds to the input video signal illustrated in FIG. 3.

Figure 6:
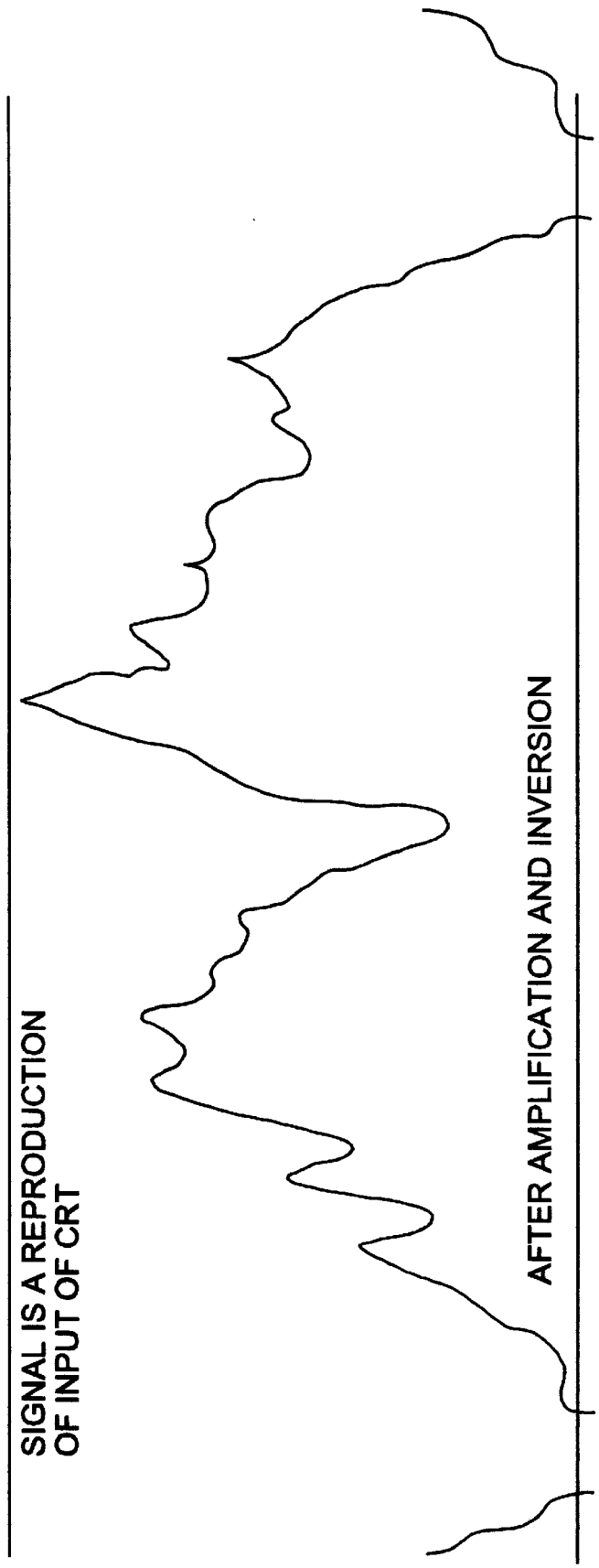
FIG. 6 illustrates the output of the detector circuit illustrated in FIG. 7.
Figure 7:
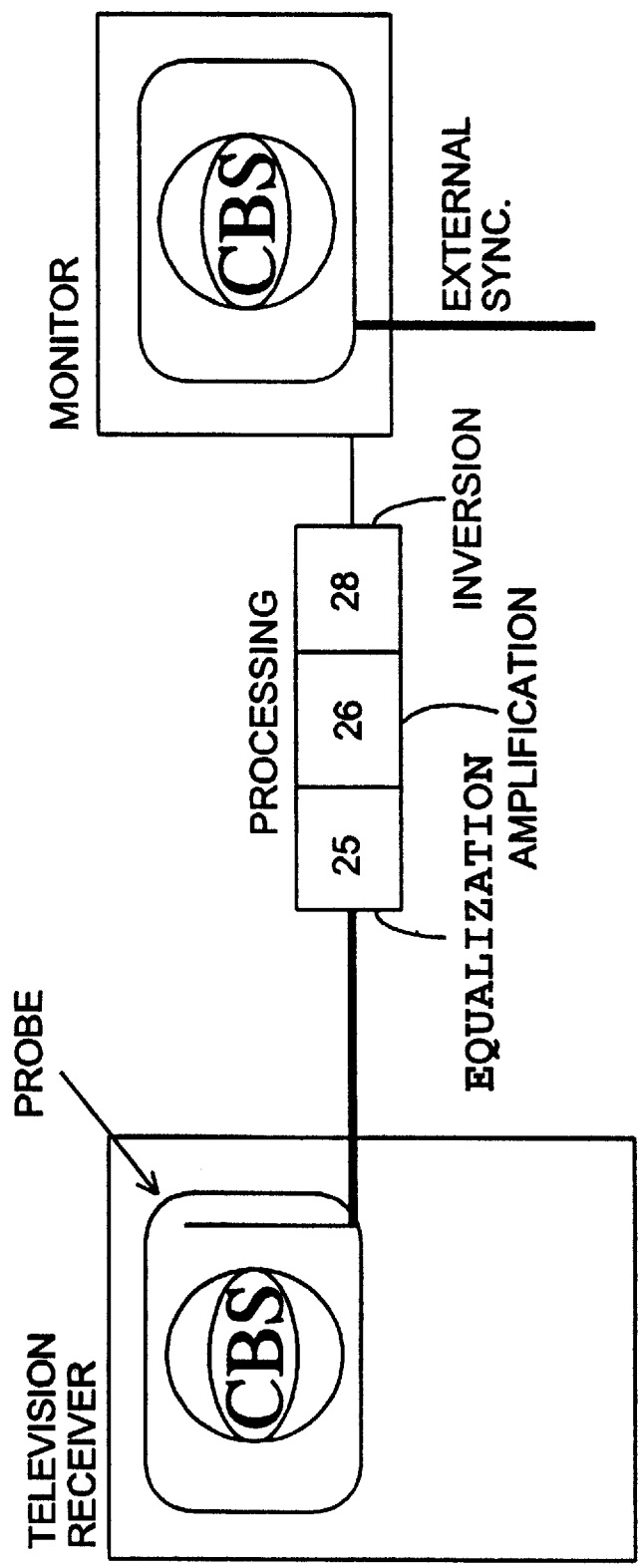
FIG. 7 illustrates an experimental set-up used to detect the signal supplied to a cathode ray tube and reproduce the signal on a separate monitor.

The correspondence between the output of the detector circuit 24 can be further demonstrated by incorporating an amplification circuit 26 and inverter circuit 28 into the detector circuit 24 and supplying the resulting output signal illustrated in FIG. 6 to a separate monitor 30 as illustrated in FIG. 7. The monitor 30 is synchronized to the input video signal supplied to the CRT using an external synchronization pulse, which results in a display on the monitor 30 that duplicates the display on the CRT being detected by the probe 22.

It will be understood by those of ordinary skill in the art that it is not necessary to actually reproduce the image displayed on the CRT on a separate monitor for purposes of detecting the program being viewed on the CRT. Instead, signal analysis circuitry (either digital or analog) may be utilized to analyze and compare the signal(s) generated by the detection circuit (e.g. Probe) to the video that represents each of the channels of potential selection made available to a device such as a television receiver thereby identifying the channel to which the receiver is actually tuned.

The invention is also not limited to the application of program detection. The probe can be utilized to permit accurate adjustment of several operation parameters of a television receiver during manufacture. For example, the probe can be utilized at the time of final alignment of the television receivers by the manufacturer. Specifically the brightness and contrast of the display can be adjusted so as to be free of white or black compression. In addition, analysis of the information present on relevant scanning lines, namely those early and late in the field and at the beginning and end points of a scanning line, permits a method of precise alignment of the scanning fields developed by the yoke relative to the surface area of the screen.

The signal recovered by the probe is rich in harmonic energy, as the overall behavior of the CRT, the internal resistance of the power supply, and the virtual capacitor created by the elements discussed above all tend to behave as a single-ended Class C resistance-coupled triode. Additionally, significant energy from the chroma portion of a color signal can be recovered both at its fundamental frequency (3.58 MHz for NTSC) and at least its second harmonic (7.16 MHz). These signals can be evaluated in such a way to render information as to the chromatic activity of the receiver.

The invention has been described with reference to certain preferred embodiments thereof. It will be understood, however, that modifications and variations are possible within the scope of the appended claims. For example, the probe may be implemented as a separate device that is attached to the face plate of CRTs as was done in the illustrated embodiment or may be incorporated during the manufacture of a CRT as an integral component. Still further, it is noted that when the probe is operated in a location where strong fields are present from radio sources that operate in the spectrum utilized by the video display CRT 9 (e.g. a few kilohertz to 4.2 MHz), the probe will also respond to these fields. The ambient field can be received by locating a second probe 32 similar in electrical properties to the main probe 22 in an area near the main probe but not in material coupling to the CRT. The signal from the second probe can be inverted by invertor 33 and applied by way of mixer 34, for example, to the signal received by the main probe to provide a significant degree of cancellation, thereby allowing the system to be essentially immune to the external field.

What is claimed is:

1. An apparatus for detecting signals displayed on a cathode ray tube, said apparatus comprising:
    a probe closely spaced from an anode of the cathode ray tube; and
    a detection circuit coupled to the probe, wherein the detection circuit produces an output signal that corresponds substantially only to a displayed image on the anode of the cathode ray tube.

2. An apparatus as claimed in claim 1, wherein the probe is located on a face plate of the cathode ray tube.

3. An apparatus as claimed in claim 2, wherein the probe is spaced from the anode by a dielectric material.

4. An apparatus as claimed in claim 3, wherein the dielectric material comprises at least a portion of the face plate of the cathode ray tube.

5. An apparatus as claimed in claim 1, wherein the detection circuit comprises an equalization network.

6. An apparatus as claimed in claim 5, wherein the detection circuit further comprises an amplification circuit coupled to the equalization network.

7. An apparatus as claimed in claim 6, wherein the detection circuit further comprises an inverter circuit coupled to the amplification circuit.

8. An apparatus as claimed in claim 1, wherein the anode comprises a fluorescent screen.

9. An apparatus as claimed in claim 1, wherein the anode comprises a shadow mask.

10. An apparatus as claimed in claim 1 further comprising a second probe for receiving electrostatic signals other than electrostatic signals resulting from the input video signal located in a position remote from said anode and coupled to said first-mentioned probe through an inverter, whereby the electrostatic signals other than those resulting from the input video signal are attenuated with respect the electrostatic signals resulting from the input video signal.

11. A method of detecting signals displayed on a cathode ray tube, comprising the steps of:
    closely spacing a probe from an anode of the cathode ray tube; and
    monitoring the probe for a signal corresponding substantially only to an image displayed on the anode of the cathode ray tube.

12. The method of claim 11, wherein the probe is spaced from the anode by dielectric material.

13. The method of claim 11, wherein the probe is adjacent the anode.

14. The method of claim 11, wherein the anode comprises at least one of a fluorescent screen and a shadow mask.

15. The method of claim 12, wherein the dielectric material is at least a portion of a face plate of the cathode ray tube.

16. The method of claim 11, further comprising amplifying the monitored signal.

17. The method of claim 11, further comprising inverting the monitored signal.

18. The method of claim 11, further comprising:

locating a second probe for receiving electrostatic signals other than electrostatic signals corresponding to an image displayed on the anode; and coupling the second probe to the first-mentioned probe through an inverter whereby the electrostatic signals other than electrostatic signals corresponding to an image displayed on the anode are attenuated with respect to the electrostatic signals corresponding to an image displayed on the anode.

* * * * *